Aug. 10, 1965 W. C. PRIOR 3,199,370
VARIABLE SPEED DRIVE MECHANISMS
Filed Sept. 18, 1962 6 Sheets-Sheet 1

INVENTOR.
WILLIAM C. PRIOR
BY *Watts & Fisher*

INVENTOR.
WILLIAM C. PRIOR
BY Watts & Fisher

INVENTOR.
WILLIAM C. PRIOR
BY Watts & Fisher

INVENTOR.
WILLIAM C. PRIOR
BY Watts & Fisher

United States Patent Office 3,199,370
Patented Aug. 10, 1965

3,199,370
VARIABLE SPEED DRIVE MECHANISMS
William C. Prior, Chagrin Falls, Ohio, assignor to
Speed Selector, Inc.
Filed Sept. 18, 1962, Ser. No. 224,421
22 Claims. (Cl. 74—640)

This invention relates generally to mechanisms for transmitting rotary motion and more specially to variable speed drive mechanisms which are infinitely variable within predetermined speed ranges.

As distinguished from conventional rotary motion transmitting mechanisms which are characterized by rigid bodies, such as gears or the like, that rotate on fixed axes, the present invention is of the class of drive mechanisms involving the use of elastic deformation to obtain the desired transmission of rotary motion. It is recognized that the concept of motion transmission by elastic deformation or deflection has been theorized and used to some extent in the past; however, heretofore, the proposed mechanisms characterized by this concept have had limited application and many have had certain disadvantages which the present invention overcomes.

For example, it has been proposed to construct a drive mechanism to include a ring gear having internal teeth adapted to be engaged by the elastic deflection of an inner gear. By progressively deflecting the inner gear around its circumference into meshing engagement with the outer gear, it is possible to obtain the transmission of motion. However, the driven speed of such a device depends upon the difference between the number of teeth of the inner and outer gears. Hence, the device cannot be considered to be infinitely variable.

Other elastic deflection drive mechanisms have been proposed in the past which involve frictional engagement between an elastically deformable element and a rigid, relatively rotatable cooperating member. The devices of this type which are known have a construction such that they are limited in use to specific applications. Moreover, most constructions have not provided an infinite variance of the driven speed within a selected speed range.

An object of the present invention is to provide drive mechanism which is constructed to obtain infinite variation of the driven speed within a selected speed range.

A more specific object of the invention is to provide a novel and improved variable speed drive mechanism of a type which uses elastic deflection to transmit rotary motion.

Another object of the invention is to provide a variable speed drive mechanism as described in the previous paragraph which is of a novel construction and arrangement such that the mechanism can be used in a wide number of commercial applications to transmit rotary motion from a drive shaft to a driven shaft.

A further object of the invention is to provide a compact, relatively inexpensive motion transmitting mechanism of the type described which is relatively maintenance free as compared to prior art apparatus.

As will be discussed in detail hereinafter, the invention contemplates novel and improved mechanisms for transmitting rotary motion from a drive shaft assembly to a driven shaft assembly, which mechanisms generally include a rigid backing member, preferably a ring, that defines a curved drive surface. A plurality of input rollers are opposed to the drive surface and are suitably loaded so as to frictionally engage selected portions of an elastic drive tube. The input rollers are operatively connected to the drive shaft assembly for orbital movement in the direction of its rotation and for rotative movement in the opposite direction so that, by orbiting and rotating the rollers, the drive tube can be rotated relative to the backing element.

According to the preferred examples of the invention, the backing element and the drive tube are relatively movable axially of the tube and also are movable toward and away from each other during relative axial movement. By changing the relative positions of the drive tube and backing member, the speed of the driven shaft assembly can be infinitely varied within a selected speed range determined by the relative dimensions of the two members.

Other objects and advantages of the invention will become apparent from the following detailed description and the accompanying drawings.

Figure 1:
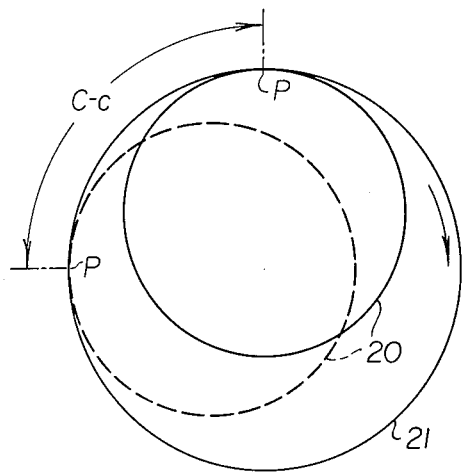
FIGURE 1 is a diagrammatical view illustrating the principles of operation of the present invention.

The general theory of the invention may be best explained with reference to the diagrammatic illustrations of FIGURES 1 and 2. Referring first to FIGURE 1, there is shown a circle 20 within a relatively larger circle 21. The two circles are tangent at a point P on the circumference of the circle 20.

If the circle 20 were rolled or orbited around the inside of the circle 21 in the direction of the arrow to the illustrated broken line position where point P again touches the circle 21, it will be apparent that the linear distance travelled would be $c$, the circumference of the smaller circle, and that the point P would be displaced counter-clockwise in the direction opposite to the orbital movement a distance equal to $C-c$, where C is the circumference of the larger circle 21. Stated differently, in orbiting $$\frac{c}{C}$$

of the inner circumference of the large circle 21, the circle 20 would rotate counter-clockwise $$\frac{C-c}{C}$$

of a revolution. Thus, during one complete orbit of the large circle in one direction, the circle 20 would rotate in the opposite direction revolutions.

Figure 2:
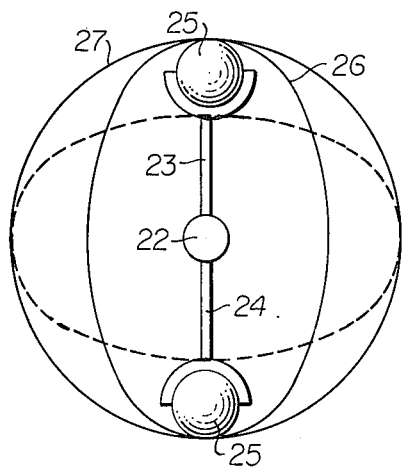
FIGURE 2 is a view showing a schematic arrangement for carrying out the general theory of operation illustrated in FIGURE 1.

The schematic assembly illustrated in FIGURE 2 includes a shaft 22 having a pair of radially extending arms 23 and 24. Each arm supports a freely rotatable ball 25. A normally circular, resiliently flexible element 26 is positioned around the balls and is distorted into elliptical shape so that diametrically opposed portions are frictionally engaged between the balls and a circular outer backing ring 27. For the purposes of the present discussion, the element 26 may be considered as having an infinitely thin wall section.

When the shaft 22 is rotated clockwise, it will be seen that the elastic element 26 will be progressively distorted by the orbiting balls 25. At the same time, the elastic element will tend to rotate counter-clockwise relative to the backing ring 27. As in the case of the circle 20 in FIGURE 1, the total relative rotation of the element 26 with respect to the ring 27 for one complete revolution of the shaft is equal to the difference between the circumferences of the ring and the normally circular elastic element 26 divided by the circumference of the elastic element. Thus, when the circumference of the two elements are equal, no relative rotation will occur. Conversely, by increasing the size of the ring 27 relative to the elastic element 26, the number of revolutions of the latter per revolution of the shaft 22 will be increased proportionately.

From the foregoing, it will be seen that, if the ring 27 were fixed against rotation, the angular velocity of the elastic element 26 would be equal to the product of the angular velocity of the shaft and the ratio $$\frac{C-c}{c}$$

and that the driven speed of the element 26 can be infinitely varied within the speed range determined by the relative sizes of the ring and the elastic element. Similarly, the elastic element can be fixed against rotation to achieve rotation of the ring 27 in the same direction as the shaft 22. In this instance, the driven speed of the ring will be equal to the product of the angular velocity of the shaft and the ratio $$\frac{C-c}{C}$$

Figure 3:
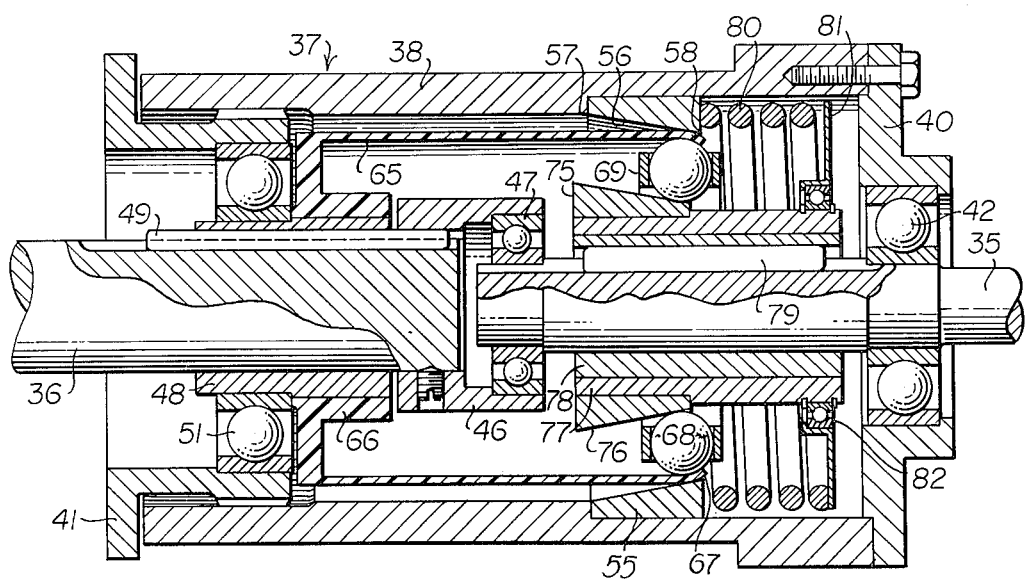
FIGURE 3 is a longitudinal cross-sectional view of one operative embodiment of the invention.
Figure 4:
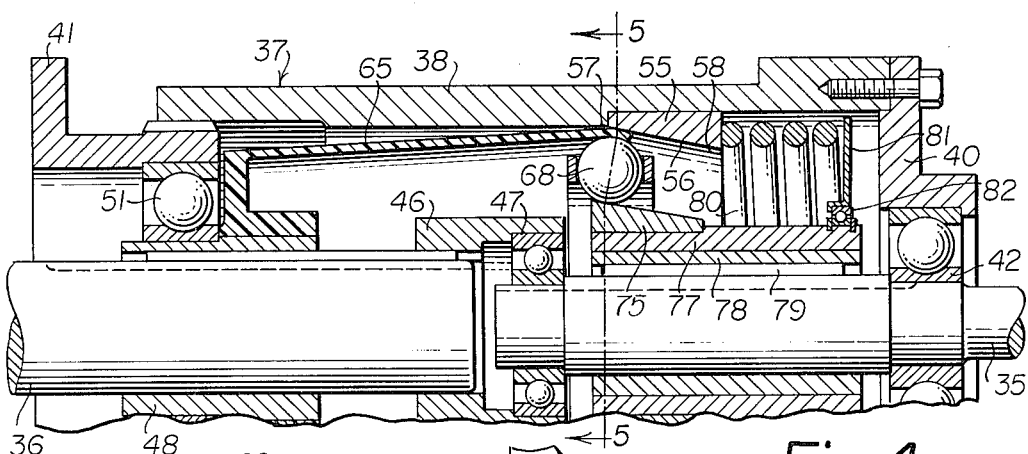
FIGURE 4 is another view similar to FIGURE 3, but showing the mechanism in a different position of operative adjustment.
Figure 5:
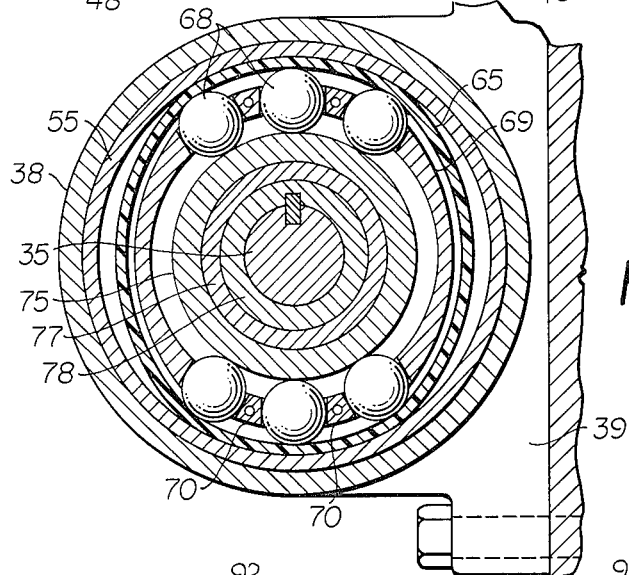
FIGURE 5 is a cross-sectional view taken on the line 5—5 of FIGURE 4.

Referring now to FIGURES 3, 4 and 5, there is shown a drive shaft 35 and a driven shaft 36 which are operatively connected by an operative embodiment 37 of the variable speed, rotary motion transmitting mechanism of the present invention. The illustrated construction includes a cylindrical casing or housing 38 which is provided with an integral mounting base 39. One end of the housing is provided with an annular removable end plate 40, while an axially adjustable collar 41 is threaded into the opposite end of the housing.

The drive shaft 35 extends into the housing 38 through the annular end plate 40 and is rotatably supported therein by bearings 42. The driven shaft 36 extends through the adjustment collar 41 in axial alignment with the drive shaft. According to the illustrated construction, the two shafts are maintained in axial alignment by a sleeve 46 which is keyed to the end of the driven shaft. The adjacent end of the drive shaft is rotatably supported by bearings 47 which are carried by the sleeve. An axially slidable bearing sleeve 48 also is mounted on the driven shaft 36 and is fixed against relative rotation by a key 49. This assembly of the driven shaft 36 and the bearing sleeve 48 is supported in the adjustment collar 41 by bearings 51.

The rotary motion transmitting mechanism includes a backing ring 55 which is fixed to the inside of the housing 38 around the drive shaft. In this embodiment of the invention, the backing ring has a tapered inner surface 56 which terminates in a radially outer edge 57 and a radially inner edge 58.

A resiliently flexible tube 65 in the form of a right cylinder has one end 66 secured to the bearing sleeve 48 on the driven shaft. The opposite open end 67 of the elastic tube terminates within the backing ring 55. In accordance with the principles of the invention generally discussed above, the diameter of the backing ring 55 at the radially inner edge 58 is substantially equal to the outer diameter of the tube 65, while the ring diameter at the radially outer edge 57 is greater than the outer diameter of the tube.

It will be apparent from the foregoing that the backing ring 55 and the elastic tube 65 are relatively movable axially of the tube between a first position in which the outer diameter of the tube substantially equals the inner diameter of the ring and a position in which the inner diameter of the ring is greater than the outer diameter of the tube. In accordance with the illustrated embodiment of the invention, this relative movement is achieved by turning the adjustment collar 41 so that the end 67 of the elastic tube is caused to advance along the tapered surface 56 of the backing ring.

Rotation of the elastic tube 65 is obtained by a plurality of input balls 68 which engage the inside wall surface of the tube in opposition to the tapered surface 56 of the backing ring 55. These balls 68 are disposed equidistant from the axis of the tube in two diametrically opposed zones and are retained in this position by a ring 69. Bearings 70 may be provided between the balls so that they are freely rotatable. As shown, the end 67 of the elastic tube is flanged radially inwardly to maintain the balls within the mouth of the tube. By this arrangement, the balls will move with the tube when it is axially advanced along the tapered surface 56 of the backing ring in the manner described above.

To establish constant frictional engagement of the tube 65 between the balls 68 and the backing ring 55, there is provided an inner ring 75 which has a tapered outer surface 76 that is parallel to the tapered surface 56 of the backing ring. This ring 75 is disposed within the backing ring so that the tapered surfaces 56 and 76 are radially spaced apart a distance equal to the diameter of the balls and the wall thickness of the elastic tube 65.

The ring 75 is mounted on a sleeve 77 which, in turn, is mounted on a coextensive bearing sleeve 78 that is axially slidable on the drive shaft 35. The bearing sleeve 78 is keyed to the shaft 35 by a key 79 so as to prevent relative rotation. The drive mechanism is loaded by a coil spring 80 which is interposed between one end of the backing ring 55 and a plate 81. As shown, the plate 81 is connected to a rotatable thrust bearing 82 which is mounted on the sleeve 77. In this manner the sleeves 77 and 78 are urged toward the end plate 40 so that the elastic tube 65 and the balls 68 are wedged between the surfaces 56 and 65 by a substantially constant force.

Because of the above-described loading of the drive mechanism and the position of the balls 68 between rings 55 and 75, it will be seen that clockwise rotation of the drive shaft 35, as viewed in FIGURE 5, will cause the balls 68 to orbit in a corresponding direction within the ring 55. At the same time, the balls will tend to rotate in the opposite direction. Depending upon the outer diameter of the elastic tube 65 relative to the inner diameter of the backing ring 55 where it is engaged by the end 67 of the tube, this rotative movement of the balls 68 will drive the tube 65 and the connected driven shaft 36 counter-clockwise.

In accordance with the above discussion relative to FIGURES 1 and 2, the speed of the driven shaft 36 depends upon the outer diameter of the elastic tube relative to the inner diameter of the engaged portion of the backing ring. By threading the adjustment collar 41 to the right, as viewed in FIGURE 3, the end 67 of the elastic tube can be advanced to the radially inner edge 58 of the backing ring. With the elements of the drive mechanism in this position, the end 67 of the elastic tube is in full circumferential engagement with the backing ring. Since the outer diameter of the tube is equal to the inner diameter of the ring at this point, no rotation of the tube 65 will occur.

To establish a drive through the drive mechanism 37, the adjustment collar 41 is threaded to the left, as illustrated in FIGURE 4, to draw the end 67 of the elastic tube, together with the balls 68, along the tapered surface 56 toward the radially outer ring edge 57. Since the diameter of the backing ring 55 at its radially outer edge 57 is greater than the normal outer diameter of the elastic tube 65, this axial movement results in the tube being progressively distorted into elliptical cross-sectional shape by the balls 68 (FIGURE 5) which are cammed radially outwardly by the tapered surface of the ring 75.

As explained above, the speed of the driven shaft increases as the difference between the effective inner diameter of the backing ring and the normal outward diameter of the elastic member becomes greater. Thus, maximum speed of the driven shaft 36 is obtained when the end 67 of the elastic tube is adjacent the radially outer edge 57 of the backing ring (FIGURE 4). Between this position and the stop position wherein the end of the tube is adjacent the radially inner edge 58 of the backing ring, the speed of the driven shaft can be infinitely varied by axial adjustment of the collar 41.

Figure 6:
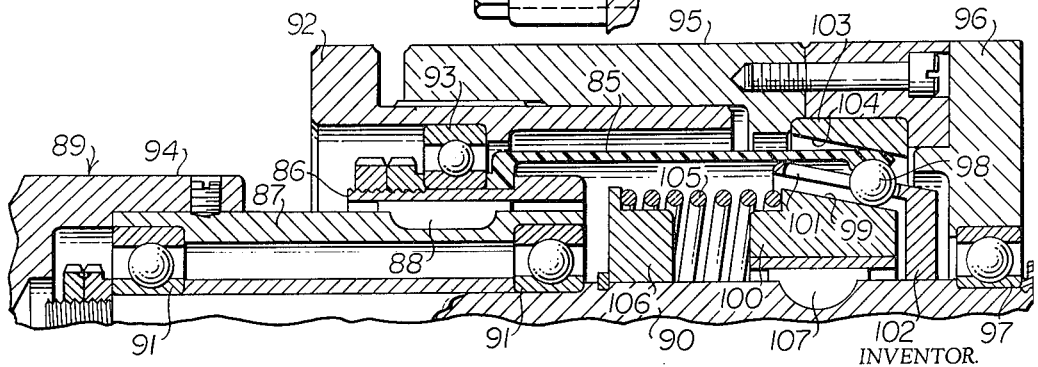
FIGURE 6 is a longitudinal cross-sectional view of another embodiment of the invention.

FIGURE 6 illustrates a modification of the construction shown in FIGURES 3, 4 and 5. A resiliently flexible tube 85, which again is in the form of a right cylinder, has one end fixed to a bearing sleeve 86 which is axially slidable on a cylinder 87 and is keyed against relative rotation by a key 88. The cylinder 87 forms part of the driven shaft assembly 89 which is supported on the drive shaft assembly 90 by bearings 91 and within the adjustment collar 92 by bearings 93. The driven shaft assembly 89 also includes an attachment member 94 which is fixed to member 87.

As in the case of the embodiment of FIGURES 3, 4 and 5, the adjustment collar 92 is threaded into one end of a suitable casing 95. The opposite end of the casing is closed by plate 96 through which the drive shaft 90 extends, the drive shaft being supported in the plate by bearings 97.

In this embodiment of the invention, only two diametrically opposed input balls 98 (only one of which is shown) are used to drive the elastic tube 85. These balls 98 rest on the tapered outer surface 99 of a camming ring 100 and are retained in slots formed in the outwardly flaring flange 101 of a ring member 102 which is fixed to the drive shaft 90.

A backing ring 103 corresponding to member 55 in FIGURES 2-4 and having an inner tapered surface 104 which is parallel to the camming surface 99 is secured to the casing 95. The surfaces 99 and 104 are spaced apart a distance substantially equal to the diameter of the balls 98 and the wall thickness of the tube 85. The modified drive mechanism is loaded by a coil spring 105 which is engaged between a ring 106 that is keyed to the drive shaft and the camming ring 100 that is axially slidable on the drive shaft and keyed against rotation by a key 107.

The operation of the drive mechanism illustrated in FIGURE 6 is the same as that discussed in connection with the embodiment of FIGURES 3, 4, and 5. Thus, to establish a drive through the mechanism, the adjustment ring 92 is axially adjusted so that the effective inner diameter of the backing ring 103 is greater than the normal outer diameter of the elastic tube 85. When the drive shaft 90 is then rotated, the balls 98 will be orbited around the inside of the backing ring 103 and will rotate in the opposite direction to drive the elastic tube 85 and the attached driven assembly 89. As in the case of the previously described drive mechanism 37, the speed of the driven shaft assembly 89 will increase as the difference between the effective inner diameter of the backing ring and the normal diameter of the tube becomes greater.

Figure 7:
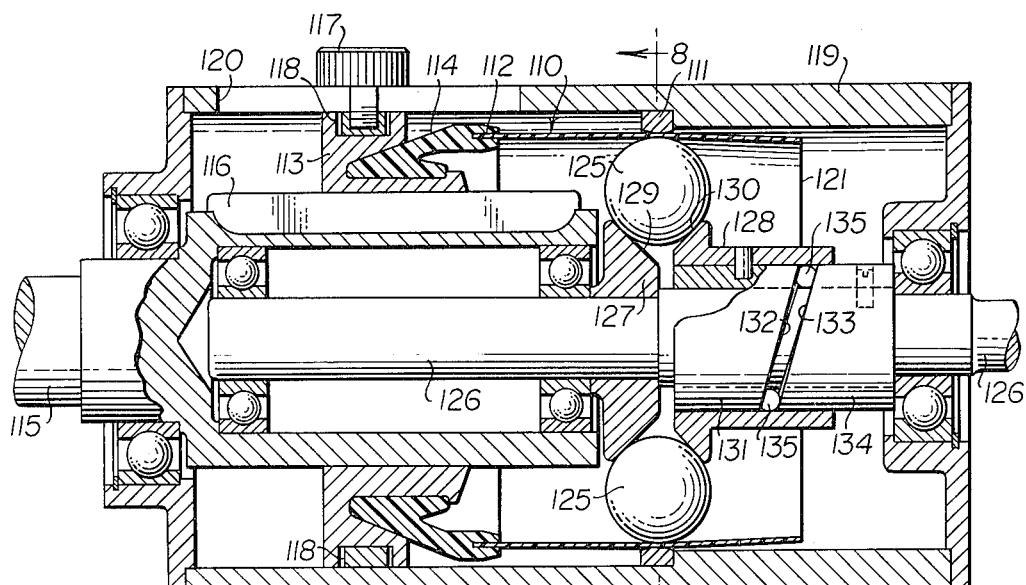
FIGURE 7 is a longitudinal cross-sectional view of still another embodiment of the invention.
Figure 8:
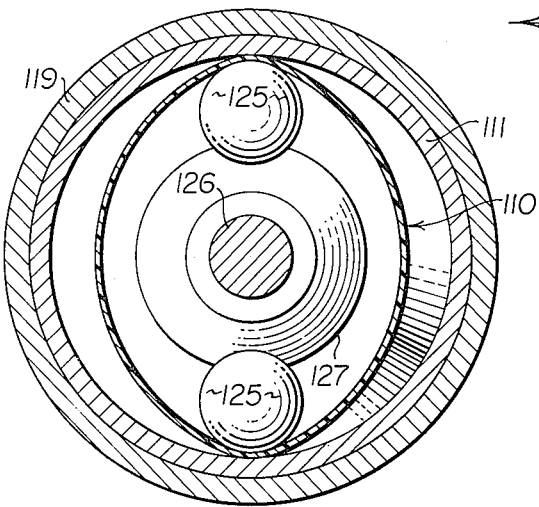
FIGURE 8 is a cross-sectional view taken on the line 8—8 of FIGURE 7.

The embodiment of the invention illustrated in FIGURES 7 and 8 differs from the embodiments previously described in several important aspects. Here the elastic tube member 110 is the frustrum of a cone, while the backing ring 111 has a substantially cylindrical inner surface. The inner diameter of the backing ring 111 is equal to the outer diameter of the large end 112 of the frustrum which is fastened to a retaining ring 113 by a clip 114.

The ring 113 is axially slidable on the drive shaft assembly 115 and is keyed against relative rotation by a key 116. An actuating tab 117 is secured to a ring 118 which is disposed in a groove formed in the retaining ring 113 so as to permit rotation of the retaining ring. This tab 117 extends through a slot 120 in the wall of the housing 119. With this arrangement, the elastic tube 110 can be moved from a stop position in which the large end 112 of the frustrum is opposed to and in circumferential engagement with the inner surface of the backing ring 111 and a maximum speed position in which the small end 121 of the frustrum is adjacent the inner surface of the backing ring.

In order to produce rotative movement of the elastic tube member 110, a pair of diametrically opposed input balls 125 are positioned around the drive shaft 126 in opposition to the inner surface of the backing ring 111. The balls 125 are wedged radially outwardly by camming members 127 and 128 which are connected in axially spaced positions to the drive shaft. These members 127 and 128 are formed with oppositely tapered surfaces 129 and 130, respectively, which urge the balls radially outwardly while maintaining them in a fixed axial position relative to the axis of the drive mechanism.

Another feature of the invention as illustrated in FIGURES 7 and 8 resides in the provision of a cam-loading mechanism for increasing the loading force of the balls 125 in response to the torque load on the driven shaft assembly 115. To this end, the member 128 is secured to a bearing sleeve 131 which is axially slidable on the drive shaft 126 toward and away from the camming ring 127. One end of this bearing sleeve 131 is formed with an axially sloping cam surface 132 which is opposed to a corresponding cam surface 133 formed on the end of an adjacent ring 134. The ring 134 is fixed on the drive shaft 126 and a plurality of balls 135 are provided between the cam surfaces 132, 133.

It will be seen from this construction that, when the drive shaft 126 and the ring 134 are rotated relative to the bearing sleeve 131, the angular displacement of the cam surface 133 will force the bearing sleeve together with the member 128 toward the member 127. As the tapered surfaces 129 and 130 of the members 127 and 128, respectively, are brought closer together, the input balls 125 will be forced radially outwardly a greater distance from the axis of the drive shaft to thereby increase the frictional engagement of the elastic tube between the balls and the backing ring 111.

In operation the tab slide 117 is adjusted to axially move the elastic tube 110 and thereby obtain the desired effective diameter relative to the fixed diameter of the backing ring 111. In any adjusted position other than when the large end 112 of the tube is in engagement with the backing ring, the tube will be elliptically distorted as illustrated in FIGURE 8 to establish a drive through the mechanism. As noted above, the maximum speed of the driven shaft 115 is obtained when the small end 120 of the frustrum is frictionally engaged between the balls 125 and the inner surface of the backing ring.

When the load on the driven shaft 115 increases, a corresponding increase of torque on the drive shaft 126 is required to orbit the balls 125 around the inside of the backing ring. Thus, a tendency is produced for the drive shaft to rotate relative to the member 128 and this causes the member to be forced toward the opposing member 127 to force the input balls 125 radially outwardly in the manner described above. With this arrangement, the frictional force between the balls and the backing ring is increased so that the driven shaft may be driven at a constant speed regardless of the torque loading. It will be apparent that this cam loading mechanism can be used in other embodiments of the invention instead of the illustrated coil springs.

Figure 9:
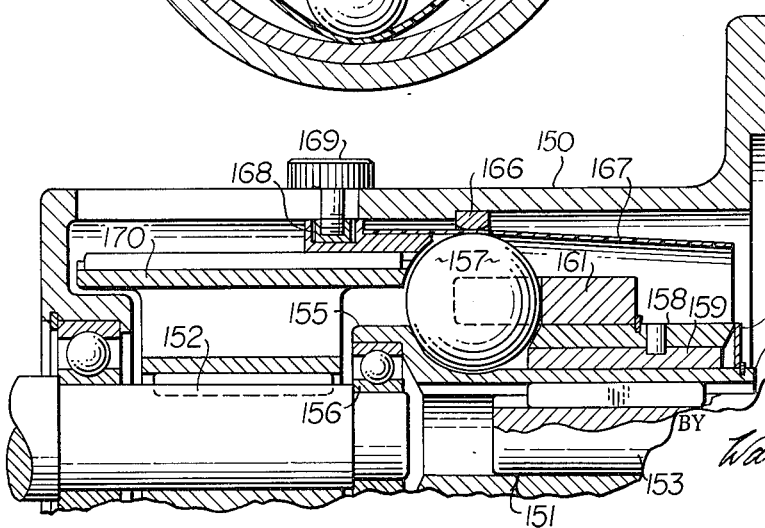
FIGURE 9 is a fragmentary, longitudinal cross-sectional view of still another embodiment of the invention.

The construction illustrated in FIGURE 9 is similar to the embodiment of FIGURES 7 and 8 and includes a casing 150, a drive shaft assembly 151, and a driven shaft assembly 152. As shown, the drive shaft assembly embodies a shaft 153 and a sleeve 154 which is keyed on the shaft. This sleeve 154 is provided at one end with an outwardly flaring head 155 in which the adjacent end of the driven shaft 152 is supported by bearings 156.

Two diametrically opposed input balls 157 (only one of which is shown) are positioned between the outwardly flaring sleeve head 155 and the oppositely flaring end surface of a cylinder 158. This cylinder 158 is mounted on a coextensive bearing sleeve 159 which is axially slidable on the sleeve 154. A Belleville washer 160 serves to load the illustrated drive mechanism by urging the assembled members 158, 159 toward the head 155 of the sleeve 154. Alternatively, the drive mechanism may be loaded by coil spring as generally shown in FIGURE 3 or it may be cam loaded as illustrated in FIGURE 7. The input balls 157 are maintained in position between longitudinal projections of a spacer ring 161 which is carried by the cylinder 158.

As shown in FIGURE 9, the input balls 157 are in driving opposition to a backing ring 166 which is mounted within the casing 150. A resiliently flexible tube 167 which corresponds to the tube 110 in FIGURES 7 and 8 is engaged between the input balls 157 and the backing ring 166. As in the case of the previously described number 110, the large end of the frustrum is connected to an adjustment ring 168 which is actuated by a tab slide 169. The ring 168 is axially slidable on a sleeve 170 which is carried by the driven shaft 152.

It will be understood that maximum speed of the driven shaft may be obtained when the tube 167 is positioned so that its small, open end is between the input balls 157 and the backing ring 166, and that the drive will be disrupted when the large end of the frustrum is between the backing ring and the input balls. The driven speed of the shaft 152 can be infinitely varied between these extreme positions.

Figure 10:
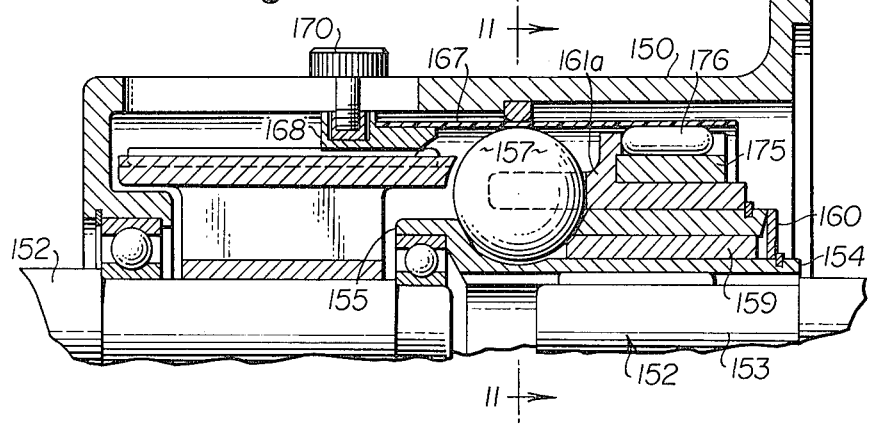
FIGURE 10 is a fragmentary, longitudinal cross-sectional view of still another embodiment of the invention.
Figure 11:
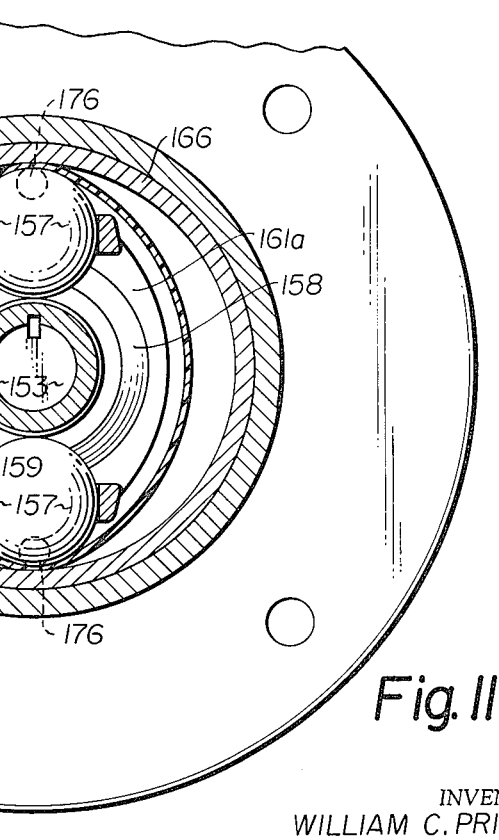
FIGURE 11 is a cross-sectional view, with portions broken away, taken generally in the plane designated 11—11 in FIGURE 10.

In some applications, it has been found desirable to maintain the elastic tube 167 in its elliptically deflected configuration throughout its axial length. To this end there is shown in FIGURES 10 and 11 a modification of the construction described in connection with FIGURE 9. According to the illustrated modification, the spacer ring 161 is formed to carry an idling ring 175. A pair of idling rollers 176 roll on the ring 175 and are spaced 180 degrees apart by the spacer 161a. These idling rollers engage the inside surface of the elastic tube 167 in diametrically opposed zones and are longitudinally aligned with the input balls 157.

Figure 12:
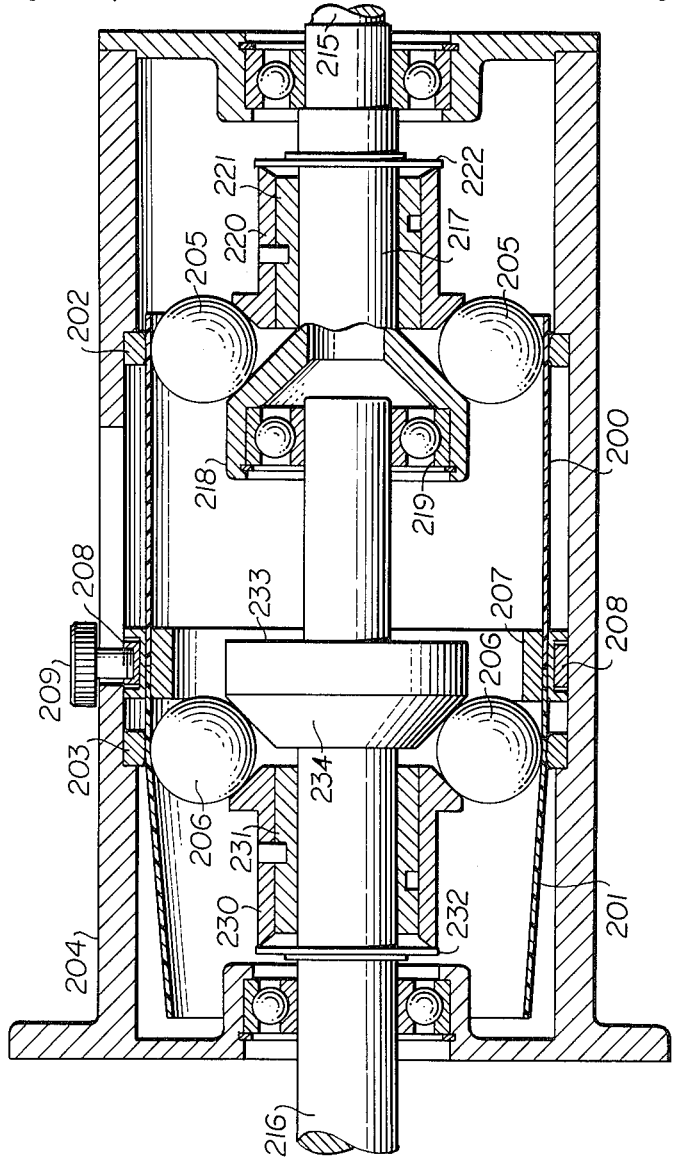
FIGURE 12 is a longitudinal cross-sectional view of still another embodiment of the invention.

Referring now to FIGURE 12, there is shown an embodiment having two resiliently flexible drive tubes 200 and 201, each being in the form of a frustrum of a cone, which have their large ends connected. Separate backing rings 202 and 203 which are fixed within the casing 204 respectively cooperate with the elastic drive tubes 200 and 201 and the sets of balls 205 and 206. The connected drive tubes are axially movable between the cooperating sets of input balls and backing rings by means of a ring 207 to which the tubes are connected, a relatively rotatable ring 208 which is mounted in a peripheral groove in the ring 207, and a tab slide 209 which extends through a slot in the casing 204 into connecting engagement with the ring 208.

As shown, the drive shaft 215 is rotatably mounted through one end of the casing 204 while the driven shaft 216 rotatably extends through the opposite end of the casing in axial alignment with the drive shaft. The drive shaft includes a sleeve 217 which is provided at one end with an outwardly flaring head 218 in which the adjacent end of the driven shaft is supported by bearings 219.

The input balls 205 are positioned between the sleeve head 218 and an assembly of a cylinder 220 and a bearing sleeve 221 which is axially slidable on the drive shaft and is loaded by a Belleville spring 222. A similar assembly of a cylinder 230, a bearing sleeve 231 and a Belleville spring 232 is provided on the driven shaft 216 for urging the output balls 206 radially outwardly in cooperation with a collar 233 which has a ball-engaging, outwardly flaring surface 234. It will be understood that the action by which the sets of input balls are pressed outwardly toward the backing rings with a substantially constant force is the same as that discussed in connection with the embodiment of FIGURE 9.

The compound drive mechanism shown in FIGURE 12 operates in essentially the same manner as the previously described forms of the invention except that it provides for a greatly expanded drive range which theoretically is from zero to infinity. For example, when the drive tubes 200 and 201 are in the illustrated position, the effective diameter of the tube 200 will be relatively small as compared to the backing ring 202. Therefore, the drive tubes will be driven at nearly their maximum speed so as to step up the drive transmitted from the drive shaft.

Rotation of the tube 201 within the backing ring 203 will cause the output balls 206 to orbit in the opposite direction and thereby produce rotation of the driven shaft 216. This action is just the opposite as that which would be obtained by transmitting motion from the shaft 216 through the balls to the drive tube. Since the effective diameter of the tube 201 (as viewed in FIGURE 12) is very nearly equal to the inner diameter of the backing ring 203, it will be apparent that the balls 206 will orbit completely around the inside of the backing ring 203 to produce one revolution of the driven shaft during a fraction of a revolution of the tube 201. In this manner the drive from the drive shaft 215 is further stepped up through the compound drive mechanism of the invention. It will be understood that a compound speed reduction can be obtained by positioning the drive tubes so that the large end of tube 200 is engaged between the balls 205 and the ring 202 and the small end of tube 201 is between the balls 206 and the backing ring 203.

Figure 13:
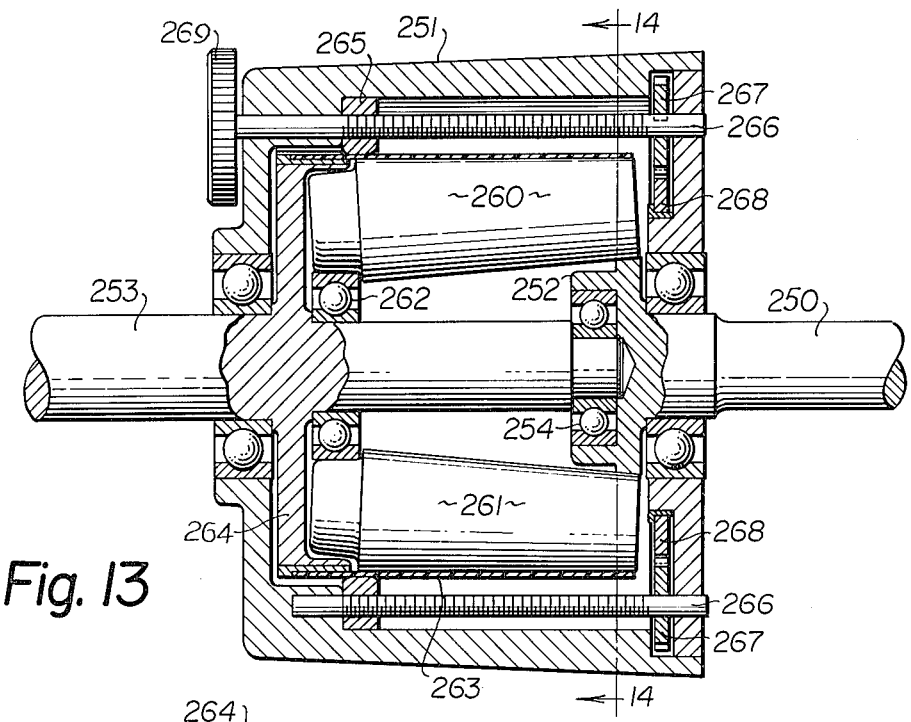
FIGURE 13 is a longitudinal cross-sectional view of still another embodiment of the invention.
Figure 14:
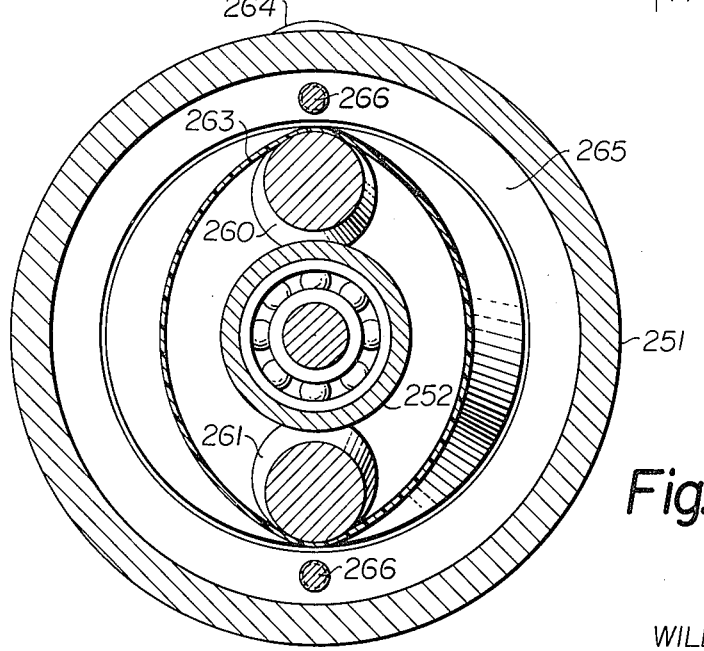
FIGURE 14 is a cross-sectional view taken on the line 14—14 of FIGURE 13.

In each of the above examples of the invention, the mechanism for transmitting rotary motion from the drive shaft to the driven shaft has included a fixed backing ring, an axially adjustable elastic tube movable within the backing ring, and opposed input balls which engage portions of the inside surface of the tube. FIGURES 13 and 14 illustrate a variation of this rotary motion transmitting structure. As shown in FIGURES 13 and 14, a drive shaft 250 rotatably extends through one end of a housing 251 and is provided with a flanged end portion 252. A driven shaft 253 rotatably extends through the opposite end of the housing and is supported within the end portion 252 of the drive shaft by bearings 254.

According to this form of the invention, a pair of tapered input rollers 260 and 261 are spaced 180 degrees apart within the housing 251. The small ends of the rollers rest in frictional engagement with the flanged end portion 252 of the drive shaft, while the large ends are supported by a bearing 262 which is carried by the driven shaft 253. With this arrangement, rotation of the drive shaft 250 will produce orbital movement and counterrotation of the tapered rollers which is similar to that displayed by the input balls of the previous embodiments.

An elastic drive tube 263 in the form of a frustrum of a cone is disposed around the rollers and extends coextensively therewith. The large end of the tube 263 is suitably connected to the periphery of a flange 264 which may be formed either as an integral part of the driven shaft 253 or by a connected element.

A backing ring 265 surrounds the elastic tube so that the latter element is frictionally engaged between the tapered rollers and the inside surface of the backing ring. A plurality of longitudinally extending, threaded rods 266 are threaded through the backing ring and are journaled for rotation in opposite end walls of the casing 251. Each of the threaded rods 266 carries a drive gear 267 which meshes with a housing gear 268 mounted within the housing. One of the rods is further provided with a handle 269 so that the rod can be rotatably adjusted to produce corresponding rotation of all the rods through the drive gears 267 and the housing gear 268. It will be understood that rotation of the threaded rods will cause the backing ring 265 to move axially of the elastic tube 263.

In the illustrated form of the invention, the normally frustro-conical drive tube 263 has a diameter at its large end which is substantially equal to the inner diameter of the backing ring 265 and is progressively distorted into elliptical cross-sectional configuration by the tapered rollers 260 and 261. Further, each roller is formed so that the apexes defined by projections of the rollers and the elastic tube are coincident when the tube is in its normal frustro-conical shape and the rollers are tangent to the inside surface of the frustro-conical tube. With this arrangement, the linear speed of the rollers and the tube will be the same at any one position along the length of the tube. The inner diameter of the backing ring 265 is made slightly less than the maximum diameter of the elliptically distorted drive tube so that the ring will be stretched to effect loading of the drive mechanism.

In operation, rotary motion of the drive shaft is transmitted through the tapered rollers which cooperate with the opposed backing ring to drive the tube 263 and the connected driven shaft. As in the case of the previously described embodiments of the invention, the speed of the driven shaft is determined by the inner diameter of the backing ring and the effective diameter of the drive tube where it is engaged between the rollers and the ring. Thus, by adjusting the position of the backing ring axially of the drive tube, the driven speed can be infinitely varied between a stop position at the large end of the tube and a maximum speed position at the small end of the tube.

In each of the above discussed examples of the invention, the elastic drive tube has been considered as having an infinitely thin wall section so that the driven speed of the mechanism at any given drive speed can be varied as a straight line function of the ratio of the inner diameter of the backing ring to the normal outer diameter of the drive tube. Thus, the driven speed theoretically depends solely on the adjusted axial position of the drive tube relative to the backing ring. In actual operation where the elastic tube has a finite wall thickness, the theoretical driven speed is affected by the stretching of portions of the tube walls over the input balls. The effect of this is to produce an effective elongation of the outside circumference of the drive tube, whereby the ratio of the outer tube diameter to the inner backing ring diameter is decreased. As a result, the actual driven speed at any one position of the drive tube relative to the backing ring is slightly less than the theoretical driven speed.

The actual driven speed also is affected when the elastic tube is made of a compressible material and the input balls are loaded so as to compress and elongate the wall portion of the tube between the balls and the backing surface. Under these conditions, it will be seen that circumference of the elastic tube is effectively elongated to reduce the ratio of the backing ring diameter to the outer diameter of the elastic tube and thereby decrease the driven speed.

Recognizing the above effects, it is possible to construct a variable speed drive mechanism in accordance with the invention to produce a reverse drive. This may be done by forming the elastic drive tube from a compressible material, such as plastic, rubber, or the like so that proper loading of the input balls will squeeze and elongate the portions of the tube walls engaged by the backing ring, and by selecting the size of the input balls so as to obtain a desired radius of bending of the tube walls over the balls. The stop position of such an arrangement can be made to occur at a point spaced from one end of the compressible, elastic tube where the normal circumference of the tube plus the incremental increase resulting the stretching of the engaged portions of the tube wall equals the inner circumference of the backing ring. When the drive tube then is moved relative to the backing ring through the stop position, the effective circumferential length of the engaged tube wall will be effectively increased relative to the inner circumferences of the backing ring. In this manner a reverse drive is obtained.

Thus, it will be seen that the invention provides a versatile variable speed drive mechanism capable of transmitting rotary-to-rotary motion in a new and improved manner. The mechanism has the advantage of being infinitely variable throughout a predetermined speed range determined by the relative dimensions of the elastic drive tube and the backing ring. By appropriately dimensioning the drive tube it is possible to obtain wide ranges of speed movement. Further, by connecting two drive tubes in the manner illustrated in FIGURES 13 and 14, it is possible to provide a drive mechanism in which the speed range theoretically extends from zero to infinity.

In addition to the above advantages, the mechanism provided by the invention is compact and of relatively simple and inexpensive construction as compared, for example, to prior art arrangements including cooperating gears and the like.

While several embodiments of the invention have been described in order to explain and illustrate the novel features and concepts involved, it is to be understood that these examples are typical and not exhaustive of the wide range of applicability of the new and improved variable speed mechanism. Further, it will be apparent that the disclosed or modified features of each embodiment can be incorporated into other embodiments to form different constructions from those specifically disclosed, but which fall under the novel concepts herein set forth.

In each instance there is provided a rotary-to-rotary motion variable speed drive mechanism that includes a backing element, a plurality of input rollers connected to a drive shaft assembly for orbital movement in one direction and for rotative movement in the opposite direction, and an elastic tube drive element which is engaged between the input rollers and the backing element and is relatively rotatable with respect to the backing element. The term "rollers" or "roller means" as used herein broadly designates all rolling bodies capable of functioning in the disclosed manner, such as balls, cylinders, and the like. The term "tube" or "tubular" as used herein is intended to designate a hollow body of revolution and includes shapes such as cones, truncated cones, cylinders and the like.

In view of the foregoing, it will be seen that many modifications and variations of the disclosed forms of the invention will be apparent to those skilled in the art. Therefore, it is to be understood that, within the scope of the appended claims, the invention can be practiced otherwise than as specifically shown and described.

What is claimed is:

1. A variable speed drive mechanism designed to transmit rotary-to-rotary motion from a drive shaft to a driven shaft, the speed of said driven shaft being infinitely variable within a predetermined speed range, said drive mechanism comprising in combination:

(a) a driven shaft;

(b) a backing member;
(c) said backing member having a continuous surface which in cross-section of said backing member describes a circle;
(d) a resiliently flexible tube member coaxially positioned with respect to said continuous surface;
(e) means connecting one of said members to said driven shaft;
(f) said tube member and said backing member being rotatable and axially movable relative to one another;
(g) said tube member having a circumferential length which varies relatively to the circumferential length of said continuous surface between two positions of relative axial movement;
(h) means for producing relative axial movement of said members;
(i) spaced input roller means adjacent said continuous surface;
(j) said tube member having circumferentially spaced portions frictionally engaged between said roller means and said continuous surface;
(k) a drive shaft structure; and,
(l) said drive shaft structure engaging said roller means for producing orbital movement in the direction of rotation of said drive shaft structure and rotative movement opposite to said orbital movement, whereby rotation of said drive shaft structure and orbital movement of said roller means will produce rotation of said driven shaft.

2. The mechanism as claimed in claim 1 wherein said backing member is arranged around said tube member.

3. The mechanism as claimed in claim 1 wherein said tube member is normally right-circular in an unstressed condition and is distorted into generally elliptical cross-sectional shape when engaged between said roller means and said continuous surface during rotation of said driven shaft.

4. A variable speed drive mechanism designed to transmit rotary-to-rotary motion from a drive shaft to a driven shaft, the speed of said driven shaft being infinitely variable within a predetermined speed range, said drive mechanism comprising in combination:
(a) a first shaft structure;
(b) a resiliently flexible tube member;
(c) said tube member being right-circular in an unstressed condition;
(d) a relatively rotatable ring member coaxially positioned around said tube member;
(e) means connecting one of said members to said first shaft structure;
(f) said ring member and said tube member being relatively movable axially of said tube member between a first position in which the circumference of said tube member substantially equals the inner circumference of said ring member and a second position in which the inner circumference of said ring member is greater than the circumference of said tube member;
(g) means for producing said relative axial movement;
(h) rotatable roller means frictionally engaging diametrically opposed portions of the inside wall surface of said tube member in opposition to the inside surface of said ring member.
(i) a second shaft structure; and,
(j) said second shaft structure engaging said roller means, said roller means being mounted for orbital movement in the direction of rotation of said second shaft structure and rotative movement opposite to said orbital movement, whereby rotation of one of said shaft structures and orbital movement of said roller means will produce rotation of the other of said shaft structures.

5. The drive mechanism as claimed in claim 4 wherein said tube member is formed of a compressible material, and wherein said drive shaft structure includes means urging said roller means against said ring to compress and elongate said tube member, said members being relatively movable to a third position wherein the circumference of the portion of said tube member engaged between said roller means and said ring member is larger than the inner circumference of said ring member.

6. The drive mechanism as claimed in claim 4 wherein said tube member is connected to said driven shaft, and wherein said ring member is fixed against rotation.

7. The drive mechanism as claimed in claim 4 wherein said drive shaft structure includes means responsive to the torque of said driven shaft for urging said roller means radially outwardly from the axis of said tube member.

8. The drive mechanism as claimed in claim 4 wherein said tube member is in the form of a frustrum of a cone.

9. The drive mechanism as claimed in claim 6 wherein said tube member is in the form of a frustrum of a cone.

10. A variable speed drive mechanism designed to transmit rotary-to-rotary motion from a drive shaft to a driven shaft, the speed of said driven shaft being infinitely variable within a predetermined speed range, said drive mechanism comprising in combination:
(a) a drive shaft structure;
(b) roller means radially positioned around said drive shaft structure in two diametrically opposed zones;
(c) said drive shaft structure including means engaging said roller means for producing orbital movement and rotation opposite to said orbital movement;
(d) a driven shaft;
(e) a ring member surrounding said roller means;
(f) a flexible tube member disposed in frictional engagement between said roller means and said ring member;
(g) means connecting one of said members to said driven shaft;
(h) said members being relatively rotatable and also relatively movable axially of said tube member between a first position in which the circumference of said tube member is substantially equal to the inner circumference of said ring member and a second position in which the circumference of said tube member is less than the inner circumference of said ring member;
(i) means for producing relative axial movement of said members; and,
(j) said tube member being elastically deflected into elliptical cross-section by said roller means while in said second position so that only diametrically opposed portions are engaged between said roller means and said ring member.

11. The drive mechanism as claimed in claim 10 wherein said tube member is formed of a compressible material, and wherein said drive shaft structure includes means urging said roller means against said ring member to compress and elongate said tube member, said members being relatively movable to a third position wherein the circumference of the portion of said tube member adjacent said ring member is larger than the inner circumference of said ring member.

12. The mechanism as claimed in claim 10 wherein said mechanism includes camming means for urging said roller means radially outwardly of said drive shaft structure.

13. The mechanism as claimed in claim 12 wherein said tube member when in an unstressed condition is in the form of a frustrum of a cone.

14. The mechanism as claimed in claim 13 wherein said ring member is non-rotatable, and wherein said tube member has its large end connected to said driven shaft.

15. A variable speed drive mechanism designed to transmit rotary-to-rotary motion from a drive shaft assembly to a driven shaft assembly, the speed of said driven shaft assembly being infinitely variable within a predetermined speed range, said drive mechanism comprising in combination:
(a) a drive shaft structure;
(b) said drive shaft structure including a camming ring having a radially outwardly tapering camming surface;
(c) roller means engaging said camming surface in two diametrically opposed zones;
(d) a non-rotatable backing ring surrounding said roller means;
(e) said backing ring defining a tapered backing surface corresponding to said camming surface;
(f) said backing surface being tapered between a radially inner edge and a radially outer edge;
(g) a rotatable resiliently flexible tube having wall portions engaged between said roller means and said backing surface;
(h) said tube being normally a right cylinder having a diameter equal to the inner diameter of said backing ring at said radially inner edge;
(i) means for moving said tube axially between a position wherein it is engaged by said roller means with said radially inner edge of said backing surface and a position wherein said tube is elastically deflected into elliptical cross-sectional configuration;
(j) a driven shaft; and,
(k) means connecting said tube to said driven shaft.

16. A drive mechanism designed to transmit rotary-to-rotary motion from a drive shaft to a driven shaft, said drive mechanism comprising in combination:
(a) a first shaft structure;
(b) a pair of diametrically opposed, tapered rollers arranged for rolling orbital movement about an axis,
(c) each of said rollers being frictionally engaged by said first shaft structure and positioned to generate a cylinder during said orbital movement;
(d) a backing ring member surrounding said rollers;
(e) a relatively rotatable, elastic tube member frictionally engaged between said rollers and said backing ring member, said tube member being frustro-conical in a normally unstressed state, and at least a portion of said tube member being distorted into generally elliptical cross-sectional shape by said rollers;
(f) said tube member and said rollers being arranged so that the apexes defined by projections of said rollers and said normally frustro-conical tube member are coincident when said tube member is in its normal state and said rollers are tangent to its inner surface;
(g) a second shaft structure; and,
(h) means connecting one of said members to said second shaft structure.

17. The mechanism as claimed in claim 16 includes means for moving said ring axially of said tube between a position in which the circumference of said tube is substantially equal to the inner circumference of said ring and another position in which the inner circumference of said ring exceeds the circumference of said tube, whereby the speed of said mechanism can be infinitely varied between said two positions.

18. A drive mechanism designed to transmit rotary-to-rotary motion from a drive shaft to a driven shaft, said drive mechanism comprising in combination:
(a) a drive shaft structure;
(b) input roller means disposed in diametrically opposed zones;
(c) said drive shaft structure engaging said input roller means for producing rolling orbital movement when said drive shaft structure is rotated;
(d) a driven shaft structure;
(e) output roller means engaging said driven shaft structure in diametrically opposed zones for rolling, orbital movement, whereby said driven shaft structure can be rotated by moving said output roller means;
(f) a non-rotatable input backing ring surrounding said input roller means;
(g) a first elastic drive tube frictionally engaged between said non-rotatable input backing ring and said input roller means;
(h) said first drive tube being elastically deformable by said input roller means into elliptical cross-sectional configuration, whereby said tube is rotatable at a different speed than said drive shaft structure;
(i) a non-rotatable output backing ring surrounding said output roller means;
(j) a second elastic drive tube connected to and corresponding in structure with said first drive tube; and,
(k) said second drive tube being frictionally engaged between said output backing ring and output roller means.

19. The mechanism as claimed in claim 18 wherein said drive tubes when unstressed are in the form of frustrums of cones and are connected at their large ends between said backing rings, each of said tubes having a diameter near its connected end where it is substantially equal to the inner diameter of the associated backing ring, and wherein said mechanism includes means for axially moving said tubes relative to said backing rings.

20. A rotary-to-rotary drive mechanism comprising:
(a) a drive shaft structure,
(b) a driven shaft,
(c) a first member having a curvilinear surface;
(d) spaced, rotatable input roller means disposed in diametrically opposed zones,
(e) a second member having a continuous curvilinear, flexible wall with a portion thereof frictionally engaged between said roller means and said curved surfaces,
(f) said wall portion having a different radius of curvature than said surface,
(g) said first and second members being relatively rotatable,
(h) means connecting one of said members to said driven shaft, and
(i) said drive shaft structure engaging said roller means for producing orbital movement of said roller means in the direction of rotation of said drive shaft structure so that said roller means, said one member and said driven shaft are rotated in the opposite direction.

21. A variable speed, rotary-to-rotary drive mechanism comprising:
(a) a drive shaft structure,
(b) a driven shaft structure,
(c) a first member defining a curvilinear backing wall,
(d) rotatable roller means mounted for orbital movement adjacent said backing wall,
(e) a second member defining a flexible tubular wall frictionally engaged between said backing wall and said roller means during orbital movement,
(f) said members being relatively rotatable,
(g) means connecting one of said members to one of said shaft structures,
(h) the other of said shaft structures engaging said roller means; and,
(i) means connected to one of said members for relatively varying the effective circumferential lengths of said walls, whereby the speed of said driven shaft structure is infinitely variable within a predetermined speed range.

22. A variable speed, rotary-to-rotary drive mechanism comprising:
(a) a drive shaft structure;
(b) a driven shaft structure;
(c) means forming a ring member;

(d) rotatable roller means mounted for orbital movement around said ring member;
(e) a resiliently flexible tube member frictionally engaged between said roller means and a surface of said ring member;
(f) said members being axially and rotatably moveable relative to one another;
(g) said tube member having a circumferential length which varies relatively to the circumferential length of said surface of said ring member between two positions of relative axial movement;
(h) means for producing relative axial movement of said members;
(i) one of said members being connected to one of said shaft structures; and
(j) the other of said shaft structures being in engagement with said rotatable roller means.

References Cited by the Examiner

UNITED STATES PATENTS

| 1,897,436 | 2/33 | Mulder | 74—796 |
| 2,030,700 | 2/36 | Hoxie | 74—10.5 |
| 2,610,525 | 9/52 | Sprigg | 74—640 |
| 2,932,986 | 4/60 | Musser | 74—640 |
| 2,943,465 | 7/60 | Musser | 74—640 |
| 3,035,460 | 5/62 | Guichard | 74—198 |
| 3,058,372 | 10/62 | Robinson | 74—640 |

OTHER REFERENCES

Musser: Machine Design, 4–61, (pp. 150–157).

DON A. WAITE, *Primary Examiner.*
BROUGHTON G. DURHAM, *Examiner.*